United States Patent
Gao et al.

(10) Patent No.: US 9,782,782 B2
(45) Date of Patent: Oct. 10, 2017

(54) FLUE GAS TREATMENT DEVICE

(71) Applicants: Shanghai Clyde Bergemann Machinery Co., Ltd., Shanghai (CN); RPT Shanghai Environmental Equipment Co., Ltd., Shanghai (CN)

(72) Inventors: Xinmin Gao, Shanghai (CN); Zhongtao Liu, Shanghai (CN); Mei Wu, Shanghai (CN); Xizhi Yu, Shanghai (CN); Ming Kang, Shanghai (CN)

(73) Assignee: Shanghai Clyde Bergemann Machinery Co., Ltd., Shanghai (CN)

( * ) Notice: Subject to any disclaimer, the term of this patent is extended or adjusted under 35 U.S.C. 154(b) by 277 days.

(21) Appl. No.: 14/482,891

(22) Filed: Sep. 10, 2014

(65) Prior Publication Data
US 2015/0182974 A1 Jul. 2, 2015

(30) Foreign Application Priority Data
Dec. 30, 2013 (CN) .......................... 2013 1 0746342

(51) Int. Cl.
*B03C 3/019* (2006.01)
*B03C 3/16* (2006.01)
(Continued)

(52) U.S. Cl.
CPC ............ *B03C 3/019* (2013.01); *B01D 53/323* (2013.01); *B01D 53/343* (2013.01);
(Continued)

(58) Field of Classification Search
CPC combination set(s) only.
See application file for complete search history.

(56) References Cited

U.S. PATENT DOCUMENTS

| 3,988,127 | A | | 10/1976 | Schumann |
| 4,074,983 | A | * | 2/1978 | Bakke ...................... B03C 3/01 |
| | | | | 96/47 |

(Continued)

FOREIGN PATENT DOCUMENTS

| CN | 101251262 A | 8/2008 |
| CN | 201105202 Y | 8/2008 |

(Continued)

OTHER PUBLICATIONS

Japanese Office Action with English translation dated Aug. 4, 2015, for JP Application No. 2014-196074, 8 pages.
Chinese Office Action for CN201310746342.3, issued Jul. 3, 2015.

*Primary Examiner* — Duane Smith
*Assistant Examiner* — Sonji Turner
(74) *Attorney, Agent, or Firm* — Schwabe Williamson & Wyatt, PC

(57) ABSTRACT

A flue gas treatment device is provided. A wet electrostatic precipitator and a flue gas heater are integrated in an integrated flue housing of the flue gas treatment device, thus the occupied area of the flue gas treatment device is smaller than that of the solution with devices being arranged separately. Furthermore, since a bidirectional transition flue is not required to be arranged in the integrated flue housing, the flue gas has a good flow uniformity, and further it is not required to arrange a flow equalization orifice plate in the flue, thus the flue gas has a small resistance, thereby reducing the power consumption of the draught fan and increasing the efficiency of the power plant.

14 Claims, 16 Drawing Sheets

(51) Int. Cl.
*B03C 3/82* (2006.01)
*B03C 3/017* (2006.01)
*B03C 3/02* (2006.01)
*B01D 53/32* (2006.01)
*B01D 53/34* (2006.01)
*B01D 53/50* (2006.01)
*B01D 53/75* (2006.01)
*B01D 53/40* (2006.01)
*B01D 53/64* (2006.01)

(52) U.S. Cl.
CPC ........... *B01D 53/501* (2013.01); *B01D 53/75* (2013.01); *B03C 3/017* (2013.01); *B03C 3/025* (2013.01); *B03C 3/16* (2013.01); *B03C 3/82* (2013.01); *B01D 53/40* (2013.01); *B01D 53/64* (2013.01); *B01D 2257/302* (2013.01); *B01D 2257/60* (2013.01); *B01D 2258/0283* (2013.01)

(56) References Cited

U.S. PATENT DOCUMENTS

| | | | |
|---|---|---|---|
| 4,573,418 A * | 3/1986 | Marzendorfer | F23J 15/006 110/254 |
| 5,282,429 A * | 2/1994 | Kato | B03C 3/01 110/215 |
| 5,449,390 A * | 9/1995 | Duncan | B03C 3/013 110/345 |
| 5,665,142 A * | 9/1997 | Wright | B03C 3/013 422/177 |
| 5,681,375 A * | 10/1997 | West, II | B03C 3/013 110/345 |
| 5,792,238 A * | 8/1998 | Johnson | B01D 53/32 95/60 |
| 5,846,301 A * | 12/1998 | Johnson | B01D 53/32 96/52 |
| 5,871,703 A * | 2/1999 | Alix | B01D 53/32 204/157.3 |
| 6,863,875 B1 * | 3/2005 | Kotake | B01D 53/60 423/235 |
| 7,022,296 B1 * | 4/2006 | Khang | B01D 53/507 423/210 |
| 7,601,317 B2 * | 10/2009 | Orita | B01D 47/05 422/105 |
| 9,155,993 B2 * | 10/2015 | Nagayasu | B01D 53/504 |
| 9,289,720 B2 * | 3/2016 | Kagawa | B01D 53/64 |
| 2002/0009793 A1 | 1/2002 | Wieser-Linhart | |
| 2004/0047773 A1 * | 3/2004 | Kato | B01D 53/502 422/172 |
| 2008/0141646 A1 | 6/2008 | Yoshida | |
| 2012/0034145 A1 * | 2/2012 | Mochizuki | B01D 53/502 423/242.1 |

FOREIGN PATENT DOCUMENTS

| | | | | |
|---|---|---|---|---|
| CN | 102941011 A | 2/2013 | | |
| CN | 203718811 U | 7/2014 | | |
| DE | 2921539 A1 | 12/1980 | | |
| DE | 4034905 A1 | 5/1992 | | |
| DE | 10048516 A1 | 4/2002 | | |
| DE | 69816509 T2 | 4/2004 | | |
| EP | 0873777 A2 | 10/1998 | | |
| EP | 1174172 A2 | 1/2002 | | |
| EP | 1182400 A1 * | 2/2002 | ......... | B01D 53/1481 |
| JP | 60156563 A * | 8/1985 | | |
| JP | S62201660 A | 9/1987 | | |
| JP | H07275652 A | 10/1995 | | |
| JP | H10290919 A | 11/1998 | | |
| JP | 2000107637 A | 4/2000 | | |
| JP | 2001289430 A | 10/2001 | | |
| JP | 2001327830 A | 11/2001 | | |
| JP | 2002136835 A | 5/2002 | | |
| JP | 3676032 B2 * | 7/2005 | ......... | B01D 53/1481 |
| JP | 2009195860 A | 9/2009 | | |
| JP | 2010-69463 | * 4/2010 | | |
| WO | 2011108324 A1 | 9/2011 | | |

* cited by examiner

FLUE GAS TREATMENT DEVICE

The present application claims the benefit of priority to Chinese patent application No. 201310746342.3, titled "flue gas treatment device", filed with the Chinese State Intellectual Property Office on Dec. 30, 2013, the entire disclosure of which is incorporated herein by reference.

FIELD

The present application relates to the technical field of flue gas treatment, in particular to a flue gas treatment device for a fossil-fuel power plant.

BACKGROUND

The ash content of coal has varied characteristics due to the diversification of coal sources of a fossil-fuel power plant, a conventional flue gas treatment device can only control the dust emission in a range of 20 to 100 mg/Nm$^3$, however, with the increased attention on PM2.5 and increasingly strict requirement for environment protection, the emission standard of the fossil-fuel power plant is required to reach a range of 20 to 30 mg/Nm$^3$, even an emission standard of 5 mg/Nm$^3$, which is similar to the emission requirement for the natural gas furnace, is required in developed regions. A wet electrostatic precipitator, which is used in the chemical industry, is applied to the fossil-fuel power plant to meet the stricter requirement for dust emission.

A wet desulphurization technology can remove most of $SO_2$, and the flue gas after the wet desulphurization is a nearly saturated wet flue gas, and generally has a temperature about 50 Celsius degree, and if such flue gas enters a stack directly, the following issues will be caused.

The temperature of about 50 Celsius degree is below several acid dew points of the flue gas. In the flue gas, a small amount of sulfur oxides, which are not completely removed after the flue gas passes through a desulfurization reaction tower, and chlorides and fluorides, which are not removed, can generate acids having a strong corrosivity in the presence of water, which causes serious corrosion to the subsequent flues and stacks, and threatens the safe running of the power plant. Thus, expensive metallic or non-metallic materials are generally used in the wet stack for corrosion prevention, which has a high requirement for cost and construction.

When a low temperature desulphurized flue gas directly leaves the stack, vapor in the flue gas mixes with the air and rapidly congeals to generate small water drops, thereby generating white smoke or light rain, that is, a water floating phenomenon, which causes visual pollution. Furthermore, since the flue gas contains solid matters such as dusts and gypsum in the desulphurization system and the low temperature flue gas after leaving the stack has a low rising height, the solid matters will be scattered around the stack in a small area, which causes a phenomenon of gypsum rain floating around the power plant, thereby seriously polluting the environment.

To address the above issues, the flue gas is passed through the wet electrostatic precipitator and a flue gas heater in sequence, and then is discharged into the stack. However, since the wet electrostatic precipitator and the flue gas heater are located at different positions and the devices are independent, a large area is required for arranging these devices.

Furthermore, each bidirectional transition flue can create a large pressure drop, and the flue gas has poor flow uniformity, thus a flow equalization orifice plate may be required which further increases the resistance, thereby causing a high pressure drop of the flue gas side, an increased pressure head of a draught fan, and an increased power consumption.

In conclusion, a technical issue to be solved by those skilled in the art is to reduce an occupied area of the device and the resistance for the flue gas.

SUMMARY

In view of this, an object of the present application is to provide a flue gas treatment device to reduce an occupied area of the device.

To achieve the above object, the following technical solutions are provided in the present application.

A flue gas treatment device is provided, which is configured to be arranged between a wet desulphurization tower and a stack in a fossil-fuel power plant, wherein the flue gas treatment device includes an integrated flue housing, a wet electrostatic precipitator and a flue gas heater, the integrated flue housing has a flue gas inlet channel configured to communicate with the wet desulphurization tower, and a flue gas outlet channel configured to communicate with the stack; the wet electrostatic precipitator and the flue gas heater are arranged in the integrated flue housing in sequence, the wet electrostatic precipitator is in communication with the flue gas inlet channel, the flue gas heater is in communication with the flue gas outlet channel, and a first transition flue is formed in the integrated flue housing at a portion between the wet electrostatic precipitator and the flue gas heater.

Preferably, in the flue gas treatment device, a first flue gas treatment unit is formed by one of the wet electrostatic precipitator and one of the flue gas heater which are arranged in a horizontal flow direction of flue gas.

Preferably, in the flue gas treatment device, one to N groups of the first flue gas treatment units are provided, and in a case that multiple groups of the first flue gas treatment units are arranged, the multiple groups of the first flue gas treatment units are arranged to be overlapped with each other in a vertical height direction or arranged in parallel in a horizontal direction, or arranged in a combined manner of the overlapped arrangement in the vertical height direction and the parallel arrangement in the horizontal direction, and in each group of the first flue gas treatment unit, the flue gas inlet channel is in communication with the flue gas outlet channel.

Preferably, in the flue gas treatment device, a second flue gas treatment unit is formed by one of the wet electrostatic precipitator and one of the flue gas heater which are arranged vertically.

Preferably, in the flue gas treatment device, one to N groups of the second flue gas treatment units are provided, and in a case that multiple groups of the second flue gas treatment units are arranged, the multiple groups of the second flue gas treatment units are arranged in parallel in a horizontal direction, and in each group of the second flue gas treatment unit, the flue gas inlet channel is in communication with the flue gas outlet channel.

Preferably, in the flue gas treatment device, a demister is further provided between the wet electrostatic precipitator and the flue gas heater, the first transition flue is located in the integrated flue housing at a portion between the wet electrostatic precipitator and the demister, and a second transition flue is formed in the integrated flue housing at a portion between the demister and the flue gas heater.

Preferably, in the flue gas treatment device, the first transition flue and the second transition flue are both a one-way transition flue. Preferably, in the flue gas treatment device, the one-way transition flue has a large flue section and a small flue section, and a ratio of an area of the large flue section to an area of the small flue section is equal to or smaller than 2:1.

Preferably, in the flue gas treatment device, a pretreatment demister is provided at a flue gas inlet side of the integrated flue housing.

According to the above technical solutions, during the operation, the flue gas from the wet desulphurization tower firstly passes through the wet electrostatic precipitator in the integrated flue housing, to remove most of fine dusts, gypsums, acid mist drips and heavy metals, thereby reducing pollutants to the air. Then, the flue gas is heated by the flue gas heater in the integrated flue housing, and finally enters the stack via a flue behind the flue gas integration device to be discharged into the air.

Compared with the conventional technology, in the flue gas treatment device of the present application, since the wet electrostatic precipitator and the flue gas heater are integrated in the integrated flue housing, the occupied area of the flue gas treatment device is smaller than that of the solution with devices being arranged separately.

Furthermore, since a bidirectional transition flue is not required to be arranged in the integrated flue housing, the flue gas has a good flow uniformity, and further it is not required to arrange a flow equalization orifice plate in the flue, thus the flue gas has a small resistance, thereby reducing the power consumption of the draught fan and increasing the efficiency of the power plant.

BRIEF DESCRIPTION OF THE DRAWINGS

For more clearly illustrating embodiments of the present application or the technical solution in the conventional technology, drawings referred to describe the embodiments or the conventional technology are briefly described hereinafter. Apparently, the drawings in the following description are only several embodiments of the present application, and for those skilled in the art other drawings may be obtained based on these drawings without any creative efforts.

REFERENCE NUMERALS IN FIGS. 1 TO 20

| 1 flue gas treatment device, | 2 wet desulphurization tower, |
|---|---|
| 3 stack; | |
| 100 first flue gas treatment unit, | 200 second flue gas treatment unit; |
| 11 wet electrostatic precipitator, | 12 demister, |
| 13 flue gas heater, | 14 integrated flue housing, |
| 15 flue gas inlet channel, | 16 first transition flue, |
| 17 second transition flue, | 18 flue gas outlet channel; |
| 4 one-way transition flue, | 41 large flue section, and |
| 42 small flue section. | |

DETAILED DESCRIPTION OF THE EMBODIMENTS

In the conventional technology, the wet electrostatic precipitator, the demister and the flue gas heater belong to different technical fields, and are designed and supplied by different manufacturers, the quantity of the devices are usually different, and arrangement manners and sizes thereof are difficult to match. Thus, in the conventional technology, these different devices are arranged at different positions, and bidirectional transition flues are provided between the different devices. Due to such arrangement, manufacturers can independently design without any interference, thereby preventing buck-passing. An object of the present application is to provide a flue gas treatment device to reduce an occupied area of the device and a resistance for the flue gas.

Embodiments are described hereinafter in conjunction with drawings. The embodiments described hereinafter are not intended to limit contents of the present application defined by the claims. Furthermore, the whole contents formed by the following embodiments are not limited to the contents which are necessary for the solutions of the present application defined by the claims.

Figure 1:
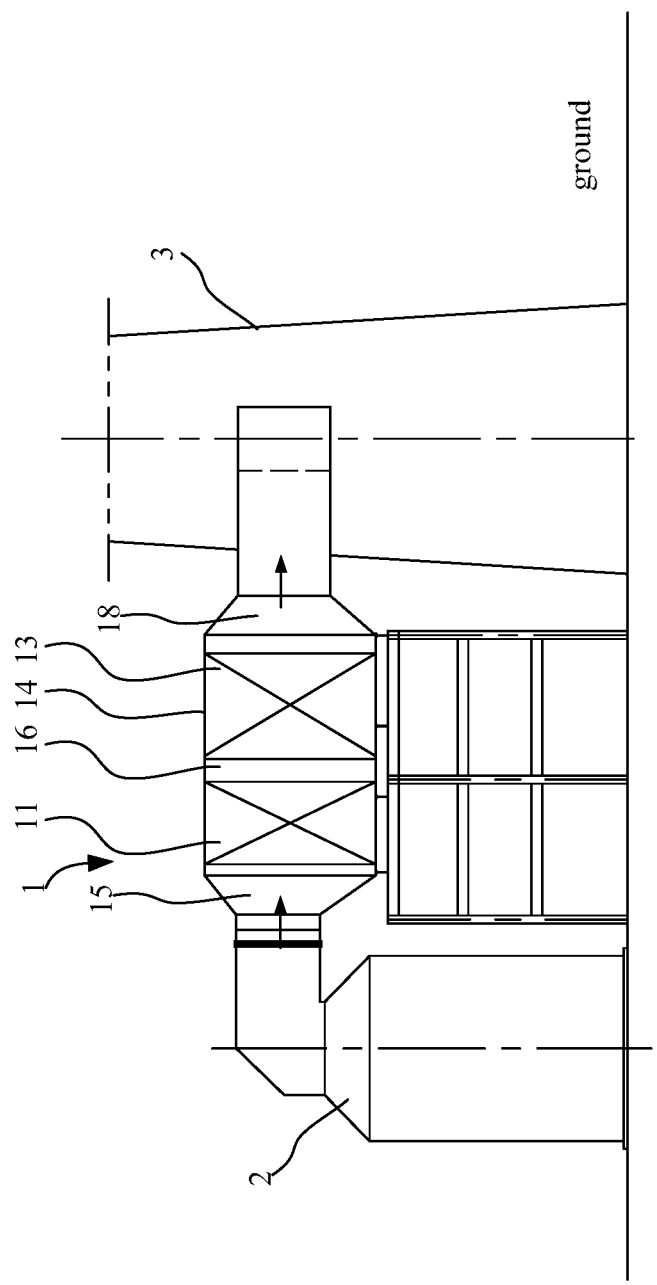
FIG. 1 is a schematic front view showing the structure of a first flue gas treatment device according to an embodiment of the present application.
Figure 2:
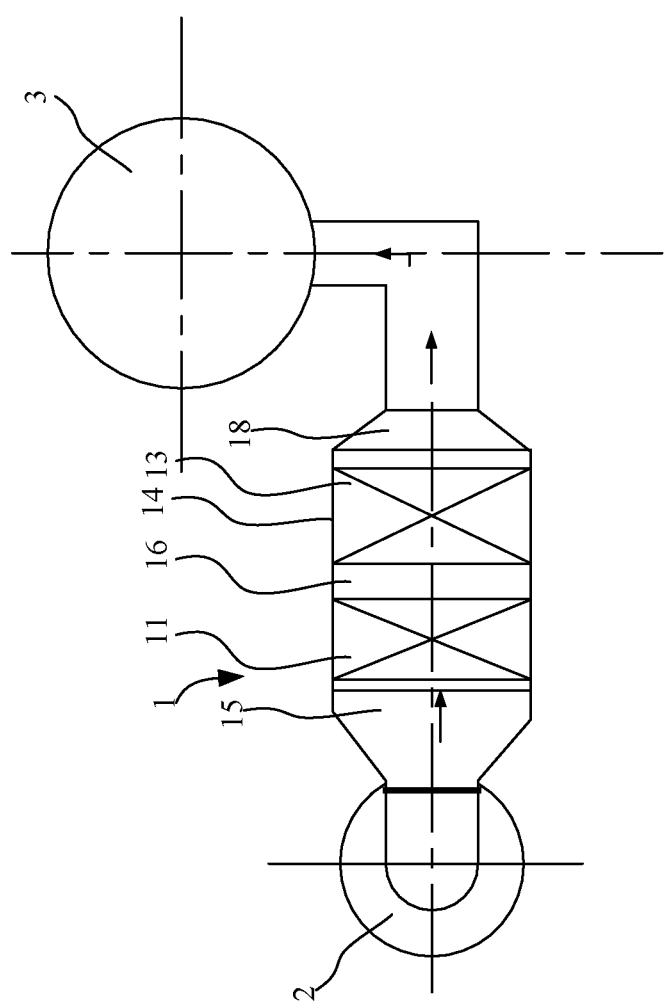
FIG. 2 is a schematic top view showing the structure of the flue gas treatment device shown in FIG. 1.
Figure 3:
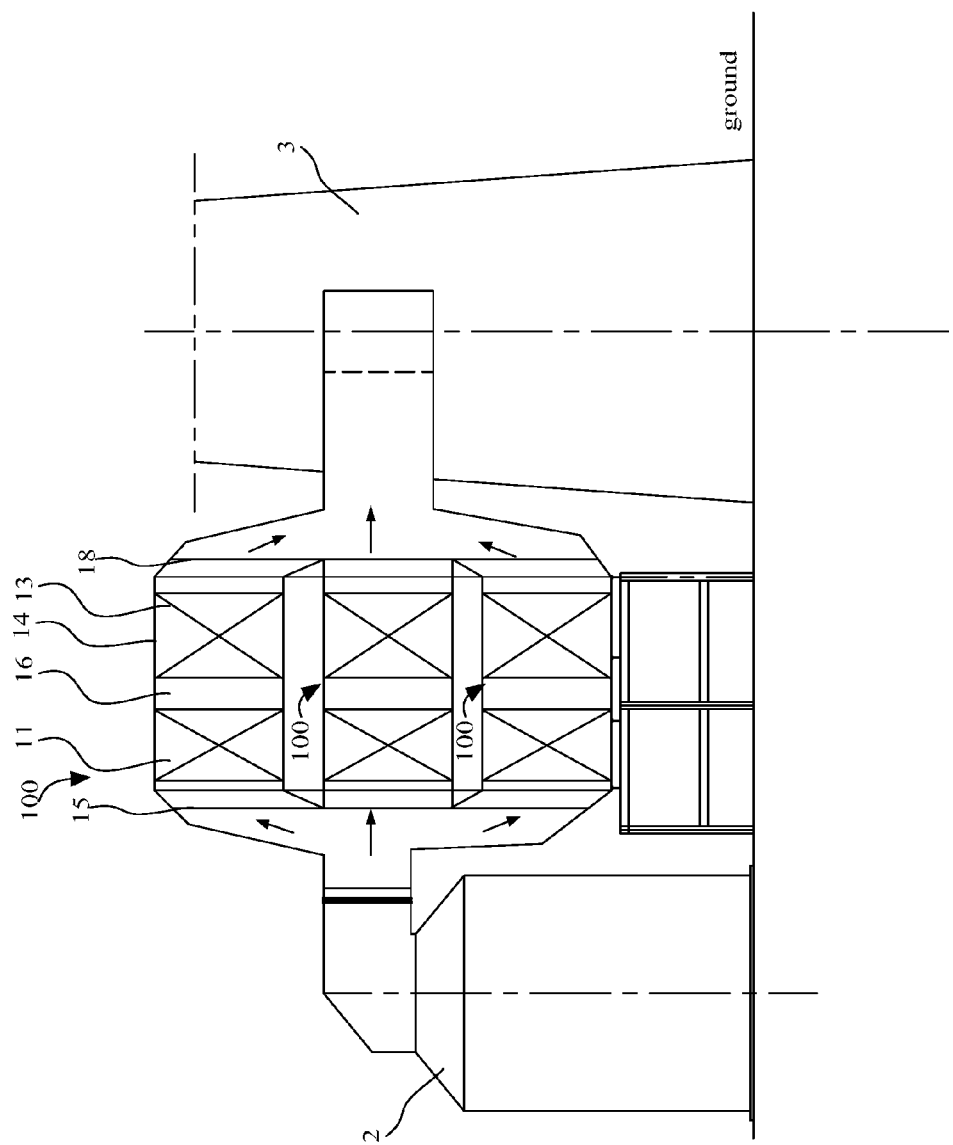
FIG. 3 is a schematic front view showing the structure of a second flue gas treatment device according to an embodiment of the present application.
Figure 4:
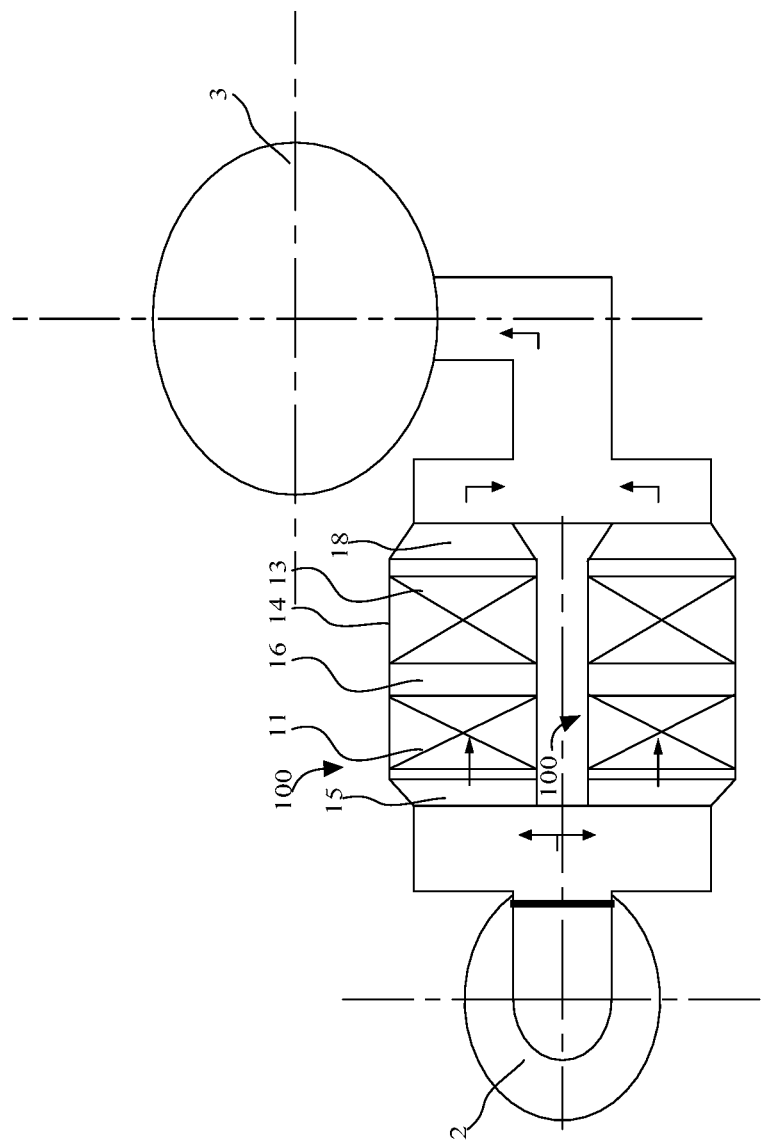
FIG. 4 is a schematic top view showing the structure of the flue gas treatment device shown in FIG. 3.
Figure 5:
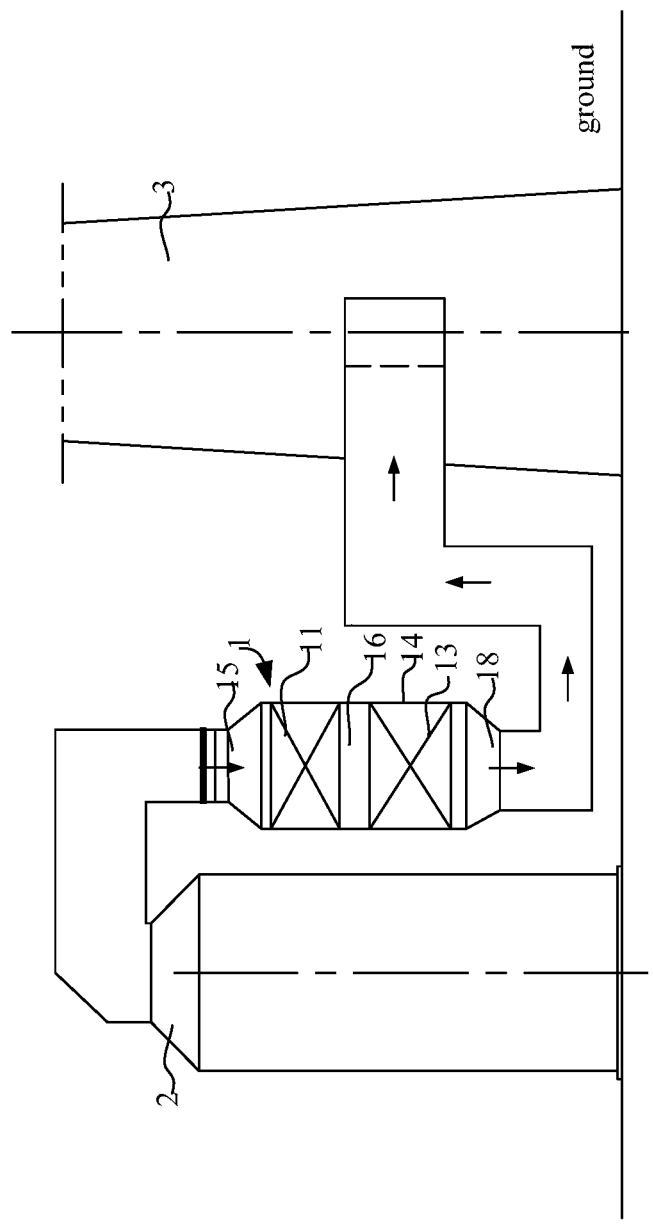
FIG. 5 is a schematic front view showing the structure of a third flue gas treatment device according to an embodiment of the present application.
Figure 6:
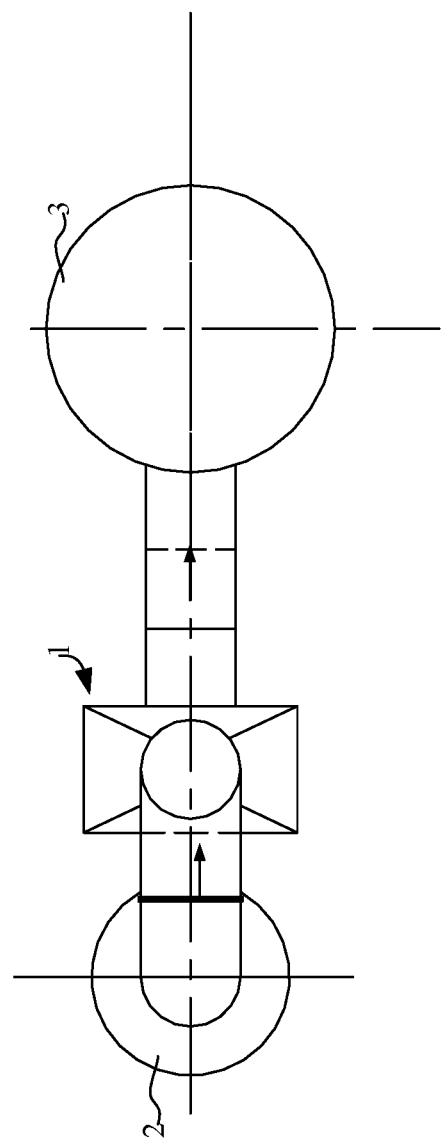
FIG. 6 is a schematic top view showing the structure of the flue gas treatment device shown in FIG. 5.
Figure 7:
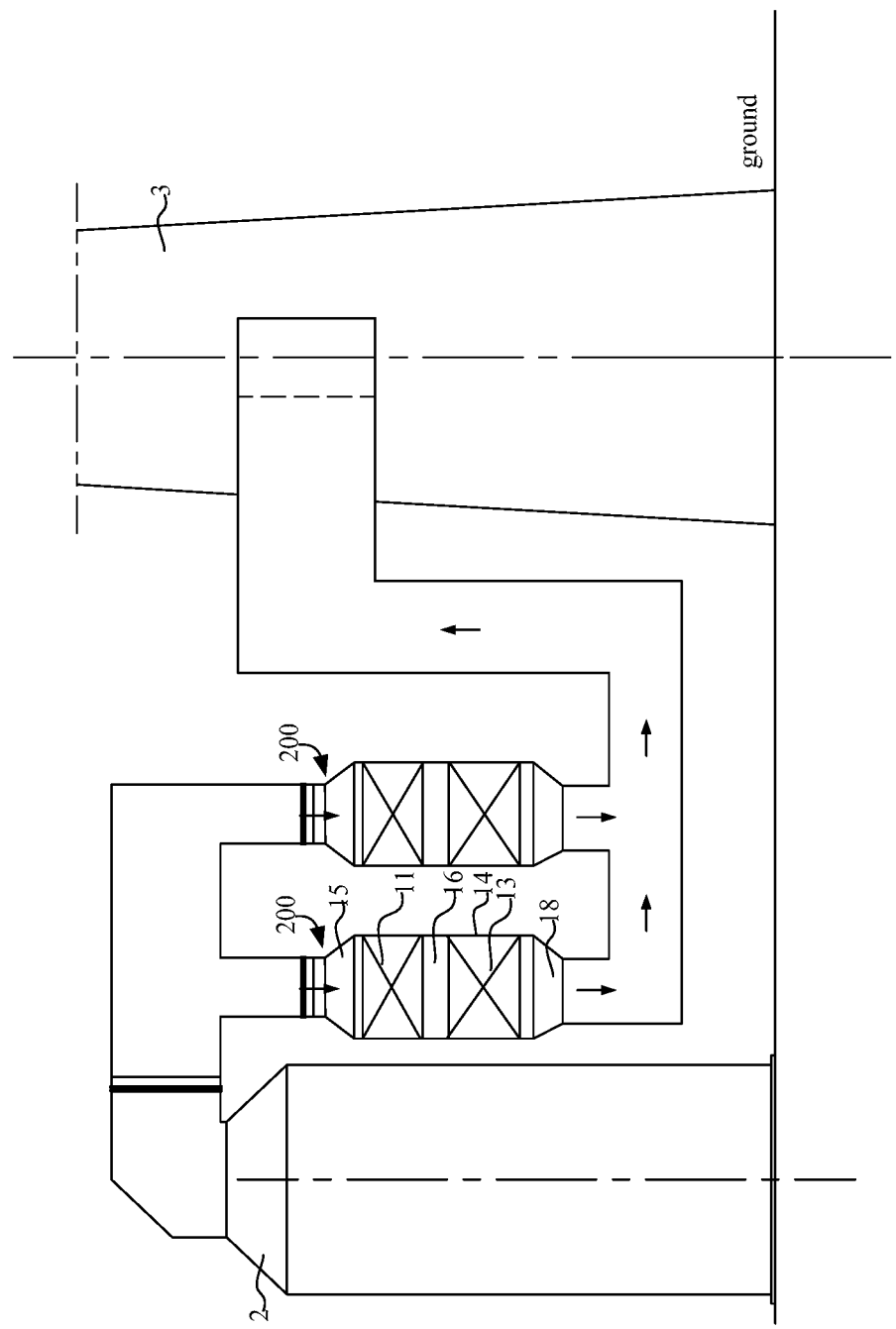
FIG. 7 is a schematic front view showing the structure of a fourth flue gas treatment device according to an embodiment of the present application.
Figure 8:
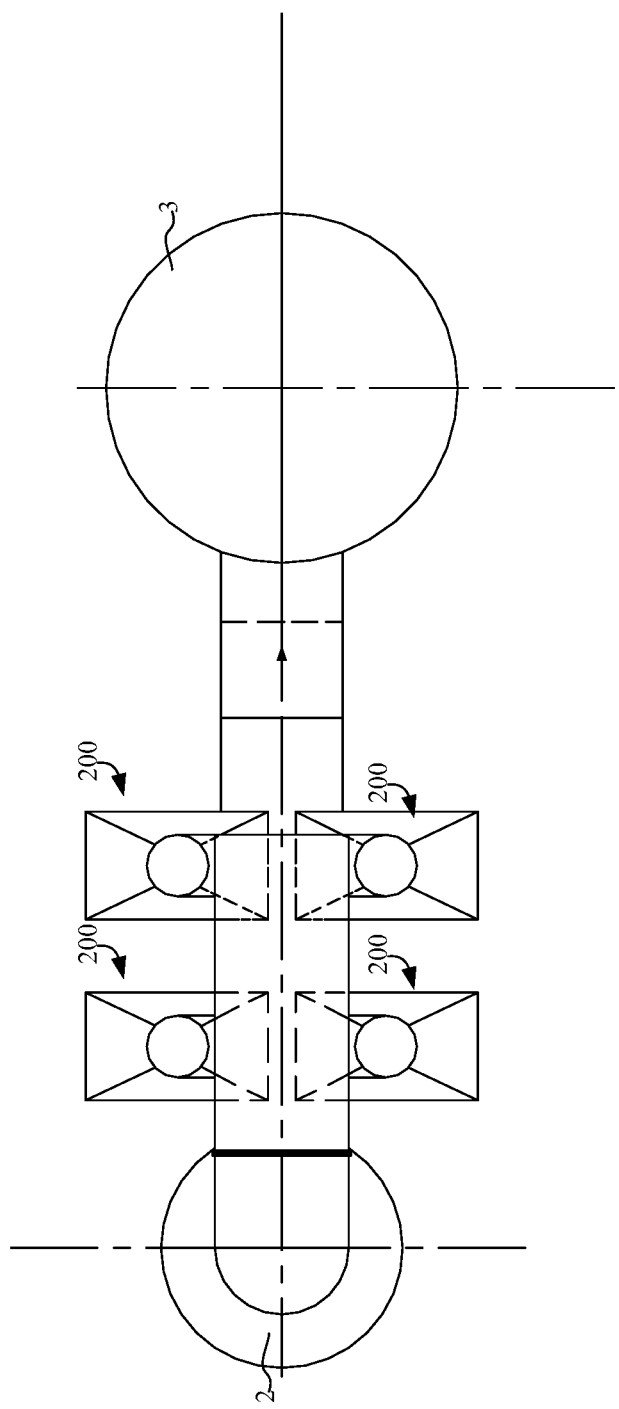
FIG. 8 is a schematic top view showing the structure of the flue gas treatment device shown in FIG. 7.

References are made to FIGS. 1 to 8, wherein FIG. 1 is a schematic front view showing the structure of a first flue gas treatment device according to an embodiment of the present application; FIG. 2 is a schematic top view showing the structure of the flue gas treatment device shown in FIG. 1; FIG. 3 is a schematic front view showing the structure of a second flue gas treatment device according to an embodiment of the present application; FIG. 4 is a schematic top view showing the structure of the flue gas treatment device shown in FIG. 3; FIG. 5 is a schematic front view showing the structure of a third flue gas treatment device according to an embodiment of the present application; FIG. 6 is a schematic top view showing the structure of the flue gas treatment device shown in FIG. 5; FIG. 7 is a schematic front view showing the structure of a fourth flue gas treatment device according to an embodiment of the present application; and FIG. 8 is a schematic top view showing the structure of the flue gas treatment device shown in FIG. 7.

A flue gas treatment device 1 is configured to be arranged between a wet desulphurization tower 2 and a stack 3 in a fossil-fuel power plant. The flue gas treatment device 1 includes an integrated flue housing 14, a wet electrostatic precipitator 11 and a flue gas heater 13, wherein the integrated flue housing 14 has a flue gas inlet channel 15 configured to communicate with the wet desulphurization tower 2, and a flue gas outlet channel 18 configured to communicate with the stack 3. The wet electrostatic precipitator 11 and the flue gas heater 13 are arranged in the integrated flue housing 14 in sequence, the wet electrostatic precipitator 11 is in communication with the flue gas inlet channel 15, the flue gas heater 13 is in communication with the flue gas outlet channel 18, and a first transition flue 16 is formed in the integrated flue housing 14 at a portion between the wet electrostatic precipitator 11 and the flue gas heater 13.

During the operation, the flue gas from the wet desulphurization tower 2 firstly passes through the wet electrostatic precipitator 11 in the integrated flue housing 14, to remove most of fine dusts, gypsums, acid mist drips and heavy metals, thereby reducing pollutants to the air. Then, the flue gas is heated by the flue gas heater 13 in the integrated flue housing 14, and finally enters the stack 3 via a flue behind the flue gas integration device to be discharged into the air.

Compared with the conventional technology, in the flue gas treatment device 1 of the present application, since the wet electrostatic precipitator 11 and the flue gas heater 13 are integrated in the integrated flue housing 14, the occupied area of the flue gas treatment device 1 is smaller than that of the solution with devices being arranged separately.

Furthermore, since a bidirectional transition flue is not required to be arranged in the integrated flue housing 14, the flue gas has a good flow uniformity, and further it is not required to arrange a flow equalization orifice plate in the flue, thus the flue gas has a small resistance, thereby reducing the power consumption of the draught fan and increasing the efficiency of the power plant.

As shown in FIGS. 1 to 4, in the flue gas treatment device according to these embodiment, a first flue gas treatment unit 100 is formed by one wet electrostatic precipitator 11 and one flue gas heater 13 which are horizontally arranged.

One to N groups of the first flue gas treatment units 100 may be provided, wherein the flue gas treatment device 1 in FIGS. 1 and 2 has one group of the first flue gas treatment unit 100, and the flue gas treatment device 1 in FIGS. 3 and 4 has six groups of the first flue gas treatment units 100. In a case that multiple groups of the first flue gas treatment units 100 are arranged, the multiple groups of the first flue gas treatment units 100 are arranged to be overlapped with each other in a vertical height direction or arranged in parallel in a horizontal direction, or arranged in a combined manner of the overlapped arrangement in the vertical height direction and the parallel arrangement in the horizontal direction, and in each group of the first flue gas treatment unit 100, the flue gas inlet channel 15 is in communication with the flue gas outlet channel 18.

As shown in FIGS. 3 and 4, the flue gas treatment device has two groups of the first flue gas treatment units 100 which are horizontally arranged, and each group of the horizontally arranged first flue gas treatment units 100 has three groups of the first flue gas treatment units 100 which are vertically arranged.

As shown in FIGS. 5 to 8, a second flue gas treatment unit 200 is formed by one wet electrostatic precipitator 11 and one flue gas heater 13 which are vertically arranged.

In the above flue gas treatment device 1, one to N groups of the second flue gas treatment units 200 may be provided. The flue gas treatment device 1 in FIGS. 5 and 6 has one group of the second flue gas treatment unit 200, and the flue gas treatment device 1 in FIGS. 7 and 8 has six groups of the second flue gas treatment units 200. In a case that multiple groups of the second flue gas treatment units 200 are arranged, the multiple groups of the second flue gas treatment units 200 are arranged in parallel in the horizontal direction, and in each group of the second flue gas treatment unit 200, the flue gas inlet channel 15 is in communication with the flue gas outlet channel 18.

Furthermore, for optimizing the above technical solutions, a demister 12 is further provided in the embodiments of the present application, and the demister 12 is arranged between the wet electrostatic precipitator 11 and the flue gas heater 13.

Figure 9:
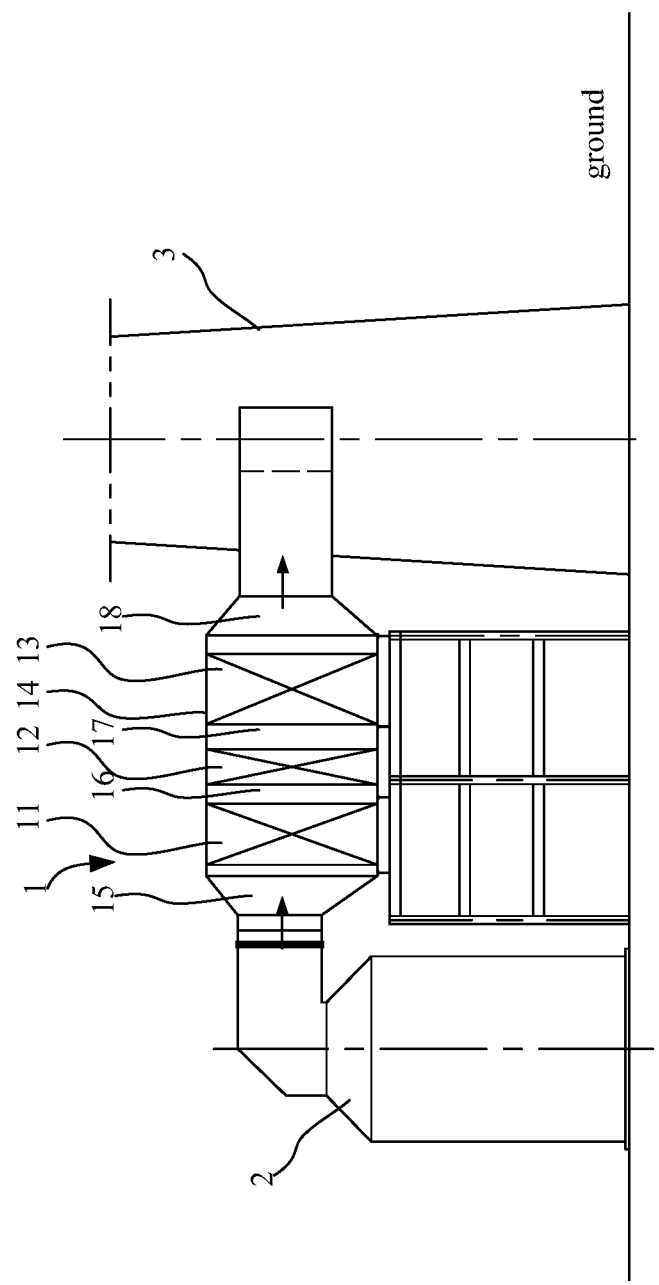
FIG. 9 is a schematic front view showing the structure of a fifth flue gas treatment device according to an embodiment of the present application.
Figure 10:
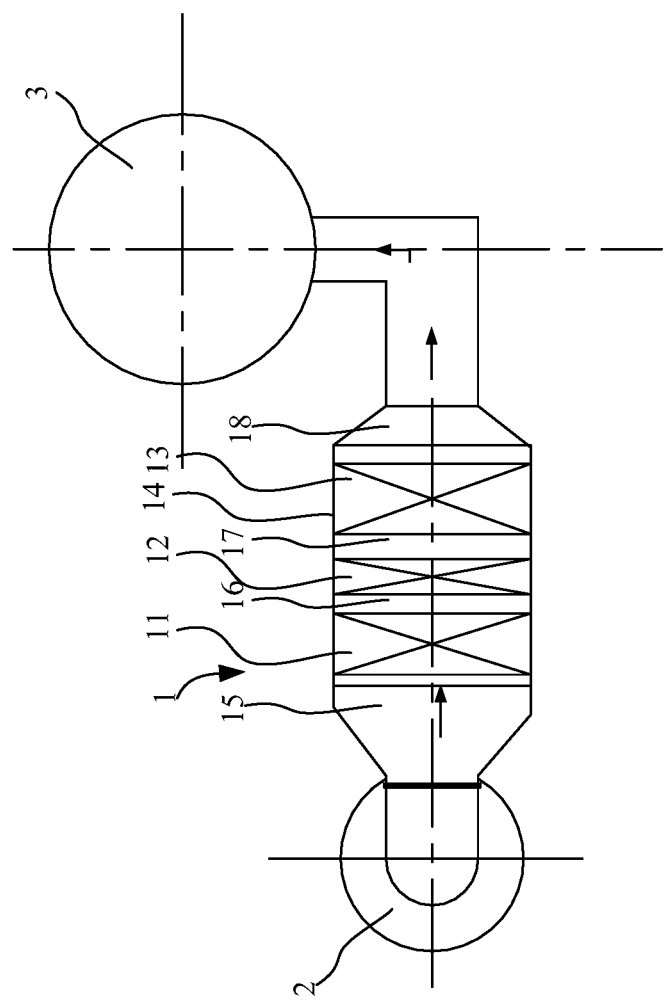
FIG. 10 is a schematic top view showing the structure of the flue gas treatment device shown in FIG. 9.
Figure 11:
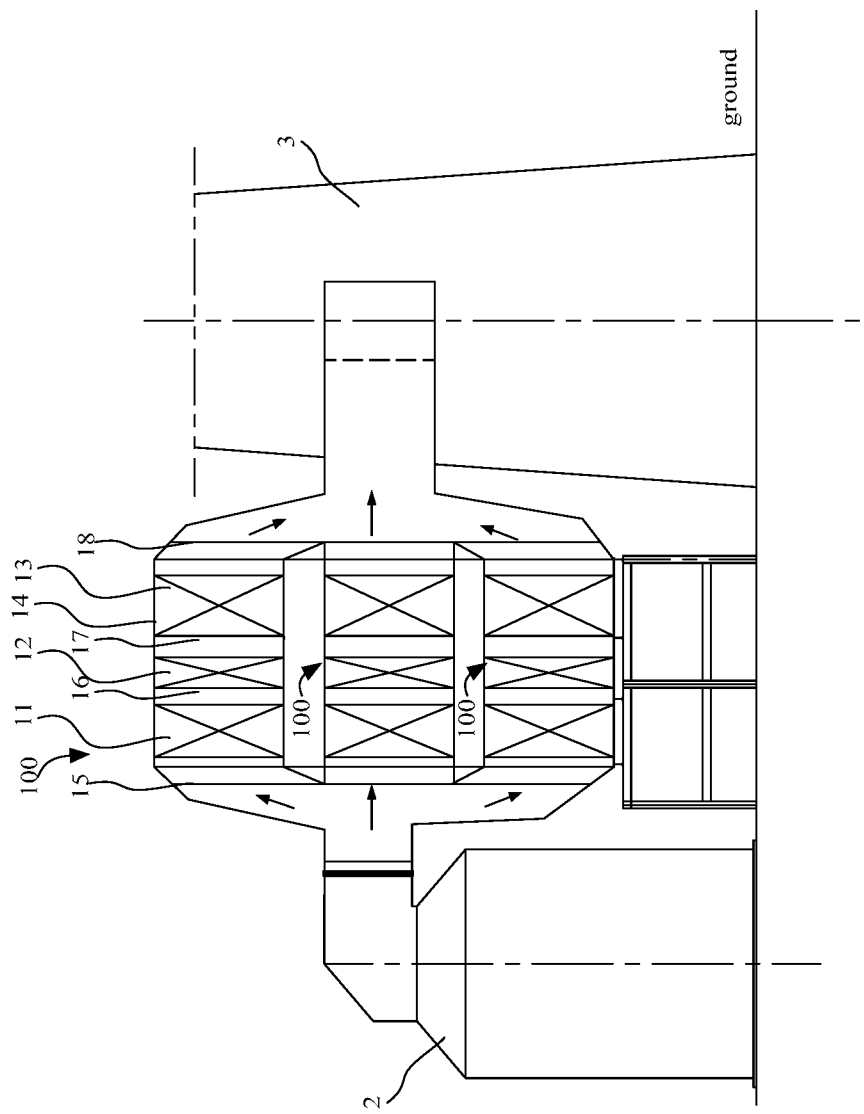
FIG. 11 is a schematic front view showing the structure of a sixth flue gas treatment device according to an embodiment of the present application.
Figure 12:
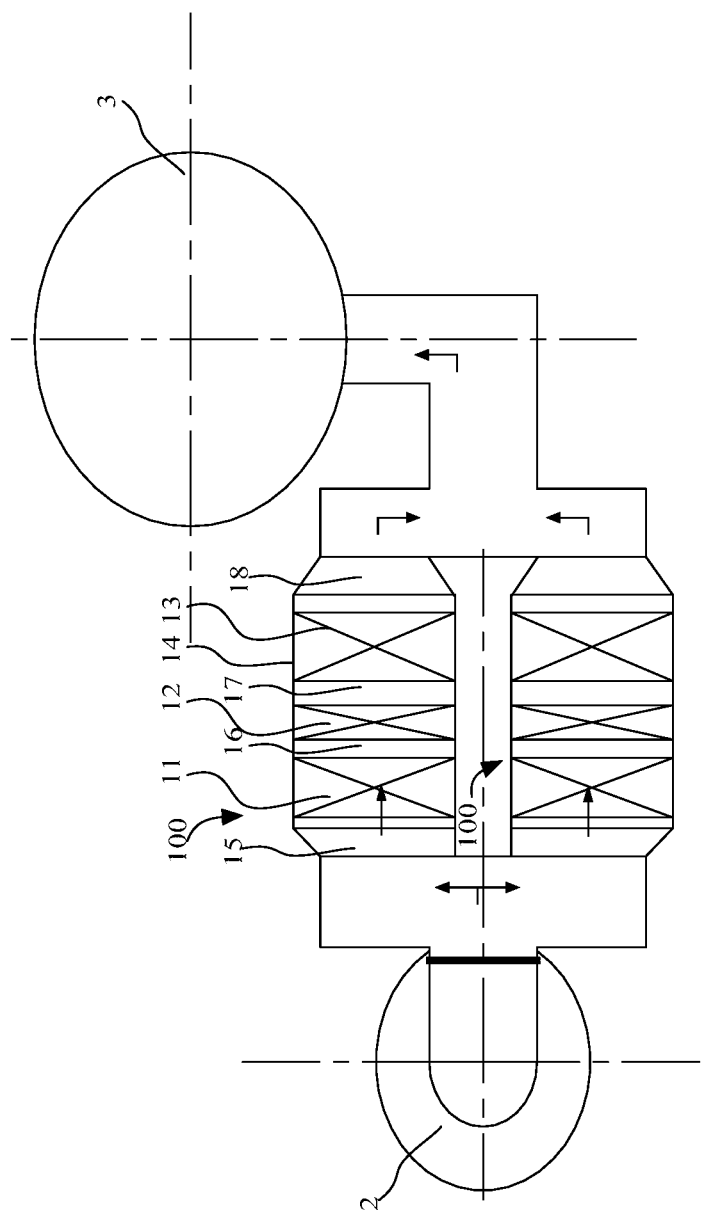
FIG. 12 is a schematic top view showing the structure of the flue gas treatment device shown in FIG. 11.
Figure 13:
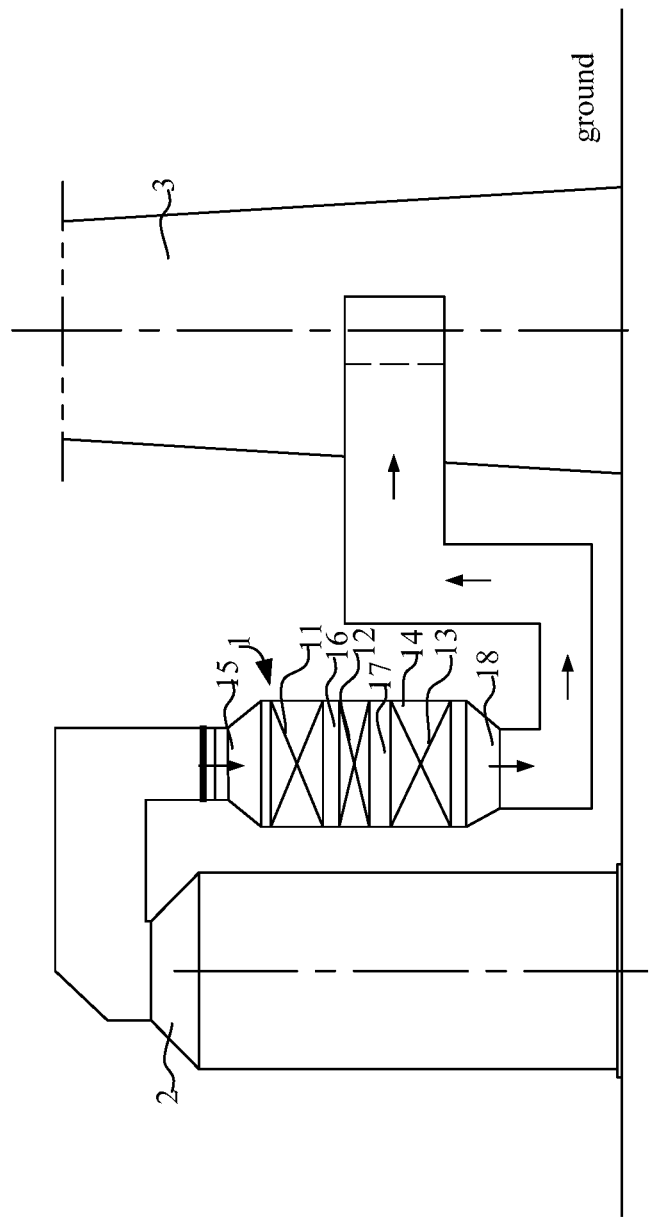
FIG. 13 is a schematic front view showing the structure of a seventh flue gas treatment device according to an embodiment of the present application.
Figure 14:
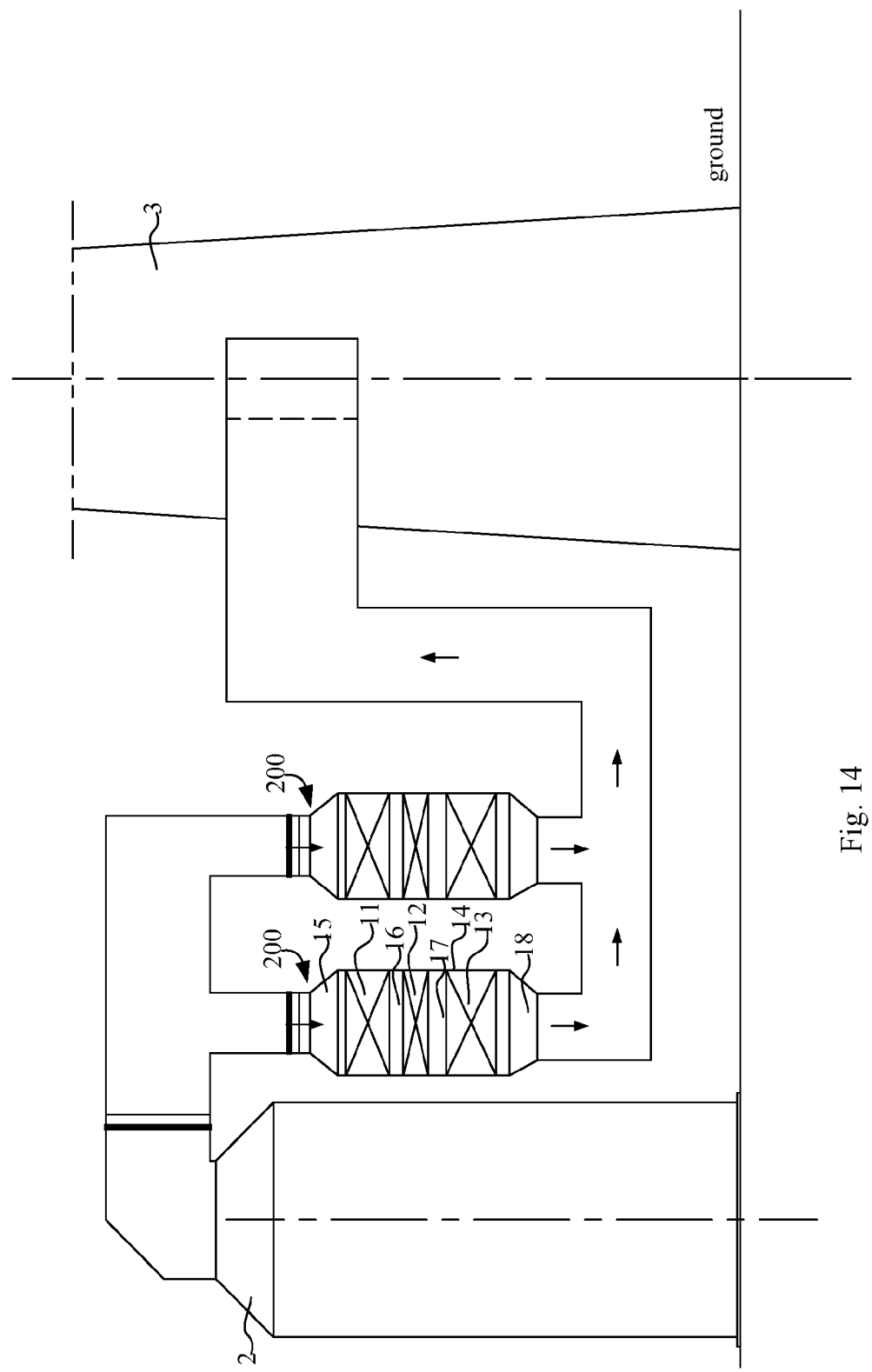
FIG. 14 is a schematic front view showing the structure of an eighth flue gas treatment device according to an embodiment of the present application.

References are made to FIGS. 9 to 14, wherein FIG. 9 is a schematic front view showing the structure of a fifth flue gas treatment device according to an embodiment of the present application; FIG. 10 is a schematic top view showing the structure of the flue gas treatment device shown in FIG. 9; FIG. 11 is a schematic front view showing the structure of a sixth flue gas treatment device according to an embodiment of the present application; FIG. 12 is a schematic top view showing the structure of the flue gas treatment device shown in FIG. 11; FIG. 13 is a schematic front view showing the structure of a seventh flue gas treatment device according to an embodiment of the present application; the top view of the flue gas treatment device shown in FIG. 13 is the same as FIG. 6; FIG. 14 is a schematic front view showing the structure of an eighth flue gas treatment device according to an embodiment of the present application the top view of the flue gas treatment device shown in FIG. 14 is the same as FIG. 8.

A wet electrostatic precipitator 11, a demister 12 and a flue gas heater 13 are arranged in the integrated flue housing 14 in sequence, the wet electrostatic precipitator 11 is in communication with the flue gas inlet channel 15, and the flue gas heater 13 is in communication with the flue gas outlet channel 18. A first transition flue 16 is formed in the integrated flue housing 14 at a portion between the wet electrostatic precipitator 11 and the demister 12, and a second transition flue 17 is formed in the integrated flue housing 14 at a portion between the demister 12 and the flue gas heater 3.

During the operation, the flue gas from the wet desulphurization tower 2 firstly passes through the wet electrostatic precipitator in the integrated flue housing 14, to remove most of fine dusts, gypsums, acid mist drips and heavy metals, thereby reducing pollutants to the air. Then the flue gas passes through the demister 12 in the integrated flue housing 14 to remove large liquid drops from the wet electrostatic precipitator, thereby reducing the possibility that the acid fog drops may be adhered to the flue gas heater 13, and decreasing corrosion to the device caused in the heating and concentrating process of the acid fog drops; and then the flue gas is heated by the flue gas heater 13 in the integrated flue housing 14, and finally enters the stack 3 via a flue behind the flue gas integration device to be discharged into the air.

Compared with the conventional technology, in the flue gas treatment device 1 of the present application, since the wet electrostatic precipitator 11, the demister 12 and the flue gas heater 13 are integrated in the integrated flue housing 14, the occupied area of the flue gas treatment device 1 is smaller than that of the solution with devices being arranged separately.

Furthermore, since a bidirectional transition flue is not required to be arranged between the wet electrostatic precipitator 11 and the demister 12, and between the demister 12 and the flue gas heater 13, the flue gas has a good flow uniformity, and further it is not required to arrange a flow equalization orifice plate in the flue, thus the flue gas has a small resistance, thereby reducing the power consumption of the draught fan and increasing the efficiency of the power plant.

As shown in FIGS. 9 to 12, in the flue gas treatment device 1 according to these embodiments, a first flue gas treatment unit 100 is formed by one wet electrostatic precipitator 11, one demister 12 and one flue gas heater 13 which are horizontally arranged.

One to N groups of the first flue gas treatment units 100 may be provided, wherein the flue gas treatment device 1 in FIGS. 9 and 10 has one group of the first flue gas treatment unit 100, and the flue gas treatment device 1 in FIGS. 11 and 12 has six groups of the first flue gas treatment units 100. In a case that multiple groups of the first flue gas treatment units 100 are arranged, the multiple groups of the first flue gas treatment units 100 are arranged to be overlapped with each other in a vertical height direction or arranged in parallel in a horizontal direction, or arranged in a combined manner of the overlapped arrangement in the vertical height direction and the parallel arrangement in the horizontal direction, and in each group of the first flue gas treatment unit 100, the flue gas inlet channel 15 is in communication with the flue gas outlet channel 18.

The flue gas treatment device shown in FIGS. 11 and 12 has two groups of the first flue gas treatment units 100 which are horizontally arranged, and each group of the horizontally arranged first flue gas treatment units 100 has three groups of first flue gas treatment units 100 which are vertically arranged.

As shown in FIGS. 13 to 14, a second flue gas treatment unit 200 is formed by one wet electrostatic precipitator 11, one demister 12 and one flue gas heater 13 which are vertically arranged.

In the above flue gas treatment device 1, one to N groups of the second flue gas treatment units 200 may be provided. The flue gas treatment device in FIG. 13 has one group of the second flue gas treatment unit 200, and the flue gas treatment device in FIG. 14 has four groups of the second flue gas treatment units 200. In a case that multiple groups of the second flue gas treatment units 200 are arranged, the multiple groups of the second flue gas treatment units 200 are arranged in parallel in the horizontal direction, and in each group of the second flue gas treatment unit 200, the flue gas inlet channel 15 is in communication with the flue gas outlet channel 18.

In the above embodiments, to reduce the resistance in the flue, the first transition flue 16 and the second transition flue 17 are both a one-way transition flue 4.

Figure 15:
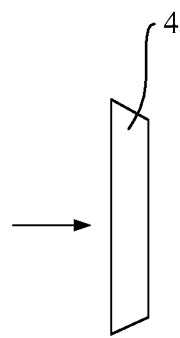
FIG. 15 is a schematic front view showing the structure of a one-way transition flue according to an embodiment of the present application.
Figure 16:
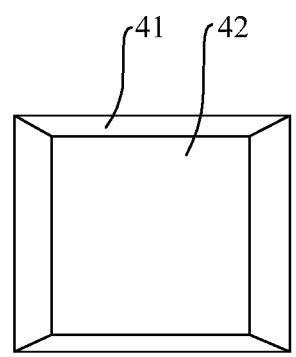
FIG. 16 is a schematic side view showing the structure of the one-way transition flue shown in FIG. 15.
Figure 17:
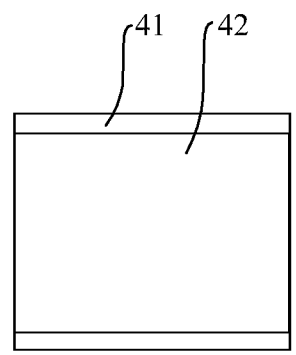
FIG. 17 is another schematic side view showing the structure of the one-way transition flue shown in FIG. 15.
Figure 18:
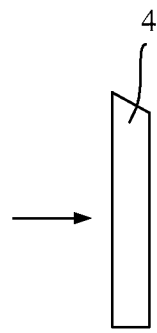
FIG. 18 is a schematic front view showing the structure of another one-way transition flue according to an embodiment of the present application.
Figure 19:
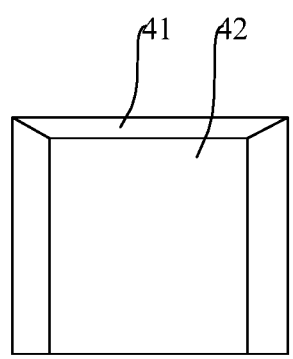
FIG. 19 is a schematic side view showing the structure of the one-way transition flue shown in FIG. 18.
Figure 20:
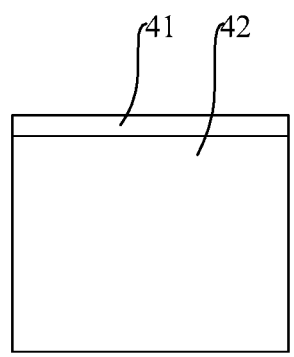
FIG. 20 is another schematic side view showing the structure of the one-way transition flue shown in FIG. 18.

References are made to FIGS. 15 to 20, wherein FIG. 15 is a schematic front view showing the structure of a one-way transition flue according to an embodiment of the present application; FIG. 16 is a schematic side view showing the structure of the one-way transition flue shown in FIG. 15; FIG. 17 is another schematic side view showing the structure of the one-way transition flue shown in FIG. 15; FIG. 18 is a schematic front view showing the structure of another one-way transition flue according to an embodiment of the present application; FIG. 19 is a schematic side view showing the structure of the one-way transition flue shown in FIG. 18; and FIG. 20 is another schematic side view showing the structure of the one-way transition flue shown in FIG. 18.

The one-way transition flue 4 includes a large flue section 41 and a small flue section 42, and the large flue section 41 and the small flue section 42 may be arranged in any sequence in the flow direction of the flue gas.

The one-way transition flue 4 shown in FIG. 16 has a quadrangular prism structure, and the section of the one-way transition flue 4 is gradually reduced from four sides of the large flue section 41 to the small flue section 42.

The one-way transition flue 4 shown in FIG. 17 has a quadrangular prism structure, and the section of the one-way transition flue 4 is gradually reduced from two sides of the large flue section 41 to the small flue section 42.

The one-way transition flue 4 shown in FIG. 19 has a quadrangular prism structure, and the section of the one-way transition flue 4 is gradually reduced from three sides of the large flue section 41 to the small flue section 42.

The one-way transition flue 4 shown in FIG. 20 has a quadrangular prism structure, and the section of the one-way transition flue 4 is gradually reduced from one side of the large flue section 41 to the small flue section 42.

The above one-way transition flues 4 are merely a few of embodiments, and any transition flue including the large flue section 41 and the small flue section 42 is deemed to fall into the scope of the present application.

Based on the description of the above embodiments, the person skilled in the art is capable of carrying out or using the present application. It is obvious for the person skilled in the art to make many modifications to these embodiments. The general principle defined herein may be realized in other embodiments without departing from the spirit or scope of the present application. Therefore, the present application is not limited to the embodiments illustrated herein, but should be defined by the broadest scope consistent with the principle and novel features disclosed herein.

What is claimed is:

1. A flue gas treatment device, configured to be arranged between a wet desulphurization tower and a stack in a fossil-fuel power plant, wherein the flue gas treatment device comprises an integrated flue housing, a wet electrostatic precipitator and a flue gas heater, the integrated flue housing has a flue gas inlet channel configured to communicate with the wet desulphurization tower, and a flue gas outlet channel configured to communicate with the stack; the wet electrostatic precipitator and the flue gas heater are arranged in the integrated flue housing in sequence, the wet electrostatic precipitator is in communication with the flue gas inlet channel, the flue gas heater is in communication with the flue gas outlet channel, and a first transition flue is formed in the integrated flue housing at a portion between the wet electrostatic precipitator and the flue gas heater; wherein a demister is further provided between the wet electrostatic precipitator and the flue gas heater, the first transition flue is located in the integrated flue housing at a portion between the wet electrostatic precipitator and the demister, and a second transition flue is formed in the integrated flue housing at a portion between the demister and the flue gas heater.

2. The flue gas treatment device according to claim 1, wherein a first flue gas treatment unit is formed by the wet electrostatic precipitator and the flue gas heater which are arranged in a horizontal flow direction of flue gas.

3. The flue gas treatment device according to claim 2, wherein one to N groups of the first flue gas treatment units are provided, and in a case that multiple groups of the first flue gas treatment units are arranged, the multiple groups of the first flue gas treatment units are arranged to be overlapped with each other in a vertical height direction or arranged in parallel in a horizontal direction, or arranged in a combined manner of the overlapped arrangement in the vertical height direction and the parallel arrangement in the horizontal direction, and in each group of the first flue gas treatment unit, the flue gas inlet channel is in communication with the flue gas outlet channel.

4. The flue gas treatment device according to claim 1, wherein a second flue gas treatment unit is formed by one of the wet electrostatic precipitator and one of the flue gas heater which are arranged in a vertical flow direction of flue gas.

5. The flue gas treatment device according to claim 4, wherein one to N groups of the second flue gas treatment units are provided, and in a case that multiple groups of the second flue gas treatment units are arranged, the multiple groups of the second flue gas treatment units are arranged in parallel in a horizontal direction, and in each group of the second flue gas treatment unit, the flue gas inlet channel is in communication with the flue gas outlet channel.

6. The flue gas treatment device according to claim 1, wherein the first transition flue and the second transition flue are both a one-way transition flue.

7. The flue gas treatment device according to claim 6, wherein the one-way transition flue has a large flue section and a small flue section, and a ratio of an area of the large flue section to an area of the small flue section is equal to or smaller than 2:1.

8. The flue gas treatment device according to claim 7, wherein a pretreatment demister is provided at a flue gas inlet side of the integrated flue housing.

9. The flue gas treatment device according to claim 2, wherein the first transition flue and the second transition flue are both a one-way transition flue.

10. The flue gas treatment device according to claim 9, wherein the one-way transition flue has a large flue section and a small flue section, and a ratio of an area of the large flue section to an area of the small flue section is equal to or smaller than 2:1.

11. The flue gas treatment device according to claim 10, wherein a pretreatment demister is provided at a flue gas inlet side of the integrated flue housing.

12. The flue gas treatment device according to claim 4, wherein the first transition flue and the second transition flue are both a one-way transition flue.

13. The flue gas treatment device according to claim 12, wherein the one-way transition flue has a large flue section and a small flue section, and a ratio of an area of the large flue section to an area of the small flue section is equal to or smaller than 2:1.

14. The flue gas treatment device according to claim 13, wherein a pretreatment demister is provided at a flue gas inlet side of the integrated flue housing.

* * * * *

UNITED STATES PATENT AND TRADEMARK OFFICE
CERTIFICATE OF CORRECTION

PATENT NO. : 9,782,782 B2  
APPLICATION NO. : 14/482891  
DATED : October 10, 2017  
INVENTOR(S) : Xinmin Gao et al.

Page 1 of 1

It is certified that error appears in the above-identified patent and that said Letters Patent is hereby corrected as shown below:

On the Title Page

(73) Assignee should read:  
Shanghai Clyde Bergemann Machinery Co., Ltd., Shanghai (CN) and RPT Shanghai Environmental Equipment Co., Ltd., Shanghai (CN)

Signed and Sealed this  
Twentieth Day of November, 2018

Andrei Iancu  
*Director of the United States Patent and Trademark Office*